United States Patent
Kanokogi et al.

(10) Patent No.: US 6,332,854 B1
(45) Date of Patent: Dec. 25, 2001

(54) BELT FOR CONTINUOUSLY VARIABLE TRANSMISSION

(75) Inventors: Ken Kanokogi; Takamichi Shimada, both of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/581,219

(22) PCT Filed: Mar. 8, 1999

(86) PCT No.: PCT/JP99/01110

§ 371 Date: Jun. 22, 2000

§ 102(e) Date: Jun. 22, 2000

(87) PCT Pub. No.: WO99/53219

PCT Pub. Date: Oct. 21, 1999

(30) Foreign Application Priority Data

Apr. 10, 1998 (JP) .................................................. 10-098664
Feb. 12, 1999 (JP) .................................................. 11-034801

(51) Int. Cl.$^7$ ....................................................... F16G 5/16
(52) U.S. Cl. ........................... 474/242; 474/244; 474/201
(58) Field of Search .................................... 474/242, 240, 474/245, 201, 244

(56) References Cited

U.S. PATENT DOCUMENTS

| | | | |
|---|---|---|---|
| 4,813,920 | * 3/1989 | Inukai et al. | 474/240 |
| 4,894,048 | * 1/1990 | Inukai et al. | 474/240 |
| 5,019,020 | * 5/1991 | Van Lith | 474/242 X |
| 5,152,722 | * 10/1992 | Yamada | 474/242 X |
| 6,074,317 | * 6/2000 | Kobayashi | 474/201 |
| 6,110,065 | * 8/2000 | Yagasaki et al. | 474/244 |

FOREIGN PATENT DOCUMENTS

| | | | |
|---|---|---|---|
| 2203439 | * 8/1979 | (EP) | . |
| 151396 | * 8/1985 | (EP) | . |
| 421804 | * 4/1991 | (EP) | . |
| 197642 | * 11/1984 | (JP) | . |
| 2-225840 | 9/1990 | (JP) | . |
| 5-240309 | 9/1993 | (JP) | . |
| 8-21488 | * 1/1996 | (JP) | . |
| 9-14357 | * 1/1997 | (JP) | . |

\* cited by examiner

*Primary Examiner*—David A. Bucci
*Assistant Examiner*—Marcus Charles
(74) *Attorney, Agent, or Firm*—Arent Fox Kintner Plotkin & Kahn, PLLC

(57) ABSTRACT

A belt for a continuously variable transmission includes a metal element 32 having a rocking edge 40 between a main surface 38 and a slope 41 on the front side of the metal element in the advancing direction and a ring slot 35, into which a metal ring assembly 31 is fitted, between an element body 34 and an ear portion 36. The position of the center of gravity G of the metal element 32 is regulated to the outside of the rocking edge 40 and to the inside of a radially outer end $35_1$ of the ring slot 35. Therefore, a relation Vr<Vg<Vs is established when a speed of the rocking edge 40 at an instant when the metal element 32 leaves a driven pulley is represented by Vr, a speed of the center of gravity G of the metal element 32 is by Vg, and a speed of the ring slot 35 at the radially outer end $35_1$ is by Vs, whereby the proper range of the center of gravity G of the metal element 32 of the belt for the continuously variable transmission can be specified correctly so that the metal element 32 located at a chord portion between the driven pulley 11 and a drive pulley 6 of a metal belt 15 is prevented from being tilted and thus can be meshed smoothly with the drive pulley 6.

2 Claims, 10 Drawing Sheets

BELT FOR CONTINUOUSLY VARIABLE TRANSMISSION

FIELD OF THE INVENTION

The present invention relates to a belt for a continuously variable transmission, including a large number of metal elements supported on metal ring assemblies each of which is comprised of a plurality of endless metal rings laminated one on another.

BACKGROUND ART

As shown in FIGS. 2 and 3, a pair of main surfaces 38 and 39 extending perpendicular to a direction of movement and parallel to each other are provided on front and rear sides of a metal element 32 in the direction of movement, and a slope 41 is formed radially inside the main surface 38 on the front side in the direction of movement so as to be continuous with the latter. A pair of adjacent ones of the metal elements 32 can be pitched relative to each other around a rocking edge 40 extending between the main surface 38 and the slope 41. Therefore, as shown in FIG. 4, when the metal elements 32 are moved from a drive pulley 6 to a driven pulley 11, the main surfaces 38 and 39 of the adjacent ones of the metal elements 32 are placed in abutment against each other to transmit a driving force. When the metal elements 32 are in a state wound around the drive pulley 6 or the driven pulley 11, the interference of the metal elements 32 with each other can be avoided by the pitching around the rocking edge 40.

The metal elements 32 of the belt for the continuously variable transmission perform a rectilinear translating movement in a chord portion of the belt between the drive pulley 6 and the driven pulley 11 and hence, the moving speeds of various portions of the metal element 32 are the same as one another. However, in a state in which the metal elements 32 are wound around the drive pulley 6 and the driven pulley 11, the metal elements 32 perform a rotating movement about rotational axes of the drive pulley 6 and the driven pulley 11 and hence, the moving speed of a radially outer portion of the metal element 32 is larger than that of a radially inner portion of the metal element 32.

At this time, the metal elements 32 wound around the pulleys 6 and 11 are brought into abutment against each other at the rocking edge 40. Therefore, the speed of the rocking edge 40 of each of the metal elements 32 wound around the pulleys 6 and 11 (the pitch circular speed) is equal to the speed of the various portions of the metal elements 32 performing the rectilinear translating movement in the chord portion. Namely, the speed of the rocking edge 40 of the metal elements 32 at belt portions wound around the pulleys 6 and 11 and the speed of the rocking edge 40 of the metal elements 32 at belt portions which are not wound around the pulleys 6 and 11 (i.e., the chord portion), are the same as each other. Therefore, in the state in which the metal elements 32 are wound around the pulleys 6 and 11, the speed of the radially outer portion of the metal element 32 than the rocking edge 40 is larger than the speed of the rocking edge 40, and the speed of the radially inner portion of the metal element 32 than the rocking edge 40 is smaller than the speed of the rocking edge 40.

Now, when the metal elements 32 lie in the chord portion between the drive pulley 6 and the driven pulley 11 to transmit the driving force, the main surfaces 38 and 39 of adjacent ones of the metal elements 32 are brought into close contact with each other and thus are prevented from being inclined. However, when the metal elements 32 lie in the chord portion between the driven pulley 11 and the drive pulley 6 to transmit no driving force, a small gap is produced between the adjacent ones of the metal elements 32 and hence, in a portion A in FIG. 4, the metal elements 32 may be meshed with the drive pulley 6 while remaining inclined in the direction of movement (with the pitching remaining occurred) in some cases. If the metal elements 32 are meshed with the drive pulley 6 while remaining inclined in the direction of movement, a movement for dissolving the pitching of the metal elements 32 and compacting the gap between the metal elements occurs in the chord portion near an outlet of the drive pulley 6 for resisting against an urging force acting between the elements and hence, the following problems arise: the wearing of the metal elements 32 and the pulley 6 is increased, and the power transmitting efficiency is reduced.

Therefore, a belt for a continuously variable transmission described in Japanese Patent Application Laid-open No.2-225840 is designed so that the center of gravity G of the metal element 32 is located in the vicinity of the rocking edge 40 or radially outside the rocking edge 40, thereby preventing a gap from being produced between the metal elements 32 in the chord portion between the driven pulley 11 and the drive pulley 6, so that the metal elements 32 in close contact with one another are smoothly meshed with the drive pulley 6.

More specifically, the speed of the center of gravity G of the metal elements 32 in the chord portion between the pulleys 6 and 11 is equal to the pitch circular speed, but the speed of the center of gravity G of the metal elements 32 wound around the pulleys 6 and 11 is larger than the pitch circular speed, if the center of gravity G lies radially outside the rocking edge 40. In other words, the kinetic energy of the metal elements 32 leaving the driven pulley 11 is larger than the kinetic energy of the metal elements 32 lying in the chord portion. The metal elements 32 lying in the chord portion are urged forwards (toward the drive pulley 6) by a difference between the kinetic energies and are smoothly meshed with the drive pulley 6 in a state placed in close contact with one another.

In the prior art described above, the center of gravity G of the metal element 32 is allowed to lie radially inside the rocking edge 40 even at a distance of 0.5 mm from the latter. However, if the center of gravity G lies radially inside the rocking edge 40, the kinetic energy of the metal element 32 leaving the driven pulley 11 becomes smaller than that of a metal element 32 lying in the chord portion and hence, the metal elements 32 lying in the chord portion cannot be meshed with the drive pulley 6 without being pitched in a state placed in close contact with one another. Therefore, it is required that the center of gravity G of the metal element 32 should lie radially outside the rocking edge 40. In other words, it is required that a relation Vr<Vg should be established when Vr represents a speed of the rocking edge 40 at an instant when the metal element 32 leaves the driven pulley 11, and Vg represents a speed of the center of gravity G of the metal element 32.

Additionally, if the center of gravity G of the metal element 32 moves radially outside too away from the rocking edge 40, the kinetic energy of the metal elements 32 which have left the driven pulley 11 becomes excessive and the metal elements 32 rotate so as to fall forwards, as shown in FIG. 10. As a result, the energy is expended by the interference between a metal ring assembly 31 and a lower portion of an ear portion 36, or by the interference of coupling, thereby resulting in loss of a force for delivering the metal elements 32 forwards. Therefore, there is a possibility that the metal elements 32 could not be meshed with the drive pulley 6 in the state free of the pitching.

DISCLOSURE OF THE INVENTION

The present invention has been accomplished with the above circumstances in view, and it is an object of the present invention to ensure that the center of gravity of the metal elements is defined correctly in a proper range, whereby the metal elements lying in the chord portion are meshed with the drive pulley in the state free of the pitching.

To achieve the above object, according to the present invention, there is provided a belt for a continuously variable transmission, comprising a large number of metal elements supported on metal ring assemblies each of which is comprised of a plurality of endless metal rings laminated one on another, the belt being wound around a drive pulley and a driven pulley to transmit a driving force between both of the pulleys, characterized in that the metal elements include ring slots for supporting the metal ring assemblies, and are pitchably in abutment against one another with a rocking edge interposed therebetween, and the following relation is established:

$$Vr<Vg<Vs$$

wherein Vr represents a speed of the rocking edge at an instant when the metal element leaves the driven pulley; Vg represents a speed of the center of gravity of the metal element; and Vs represents a speed of a radially outer end of the ring slot.

With the above arrangement, the speed Vg of the center of gravity of the metal elements is set larger than the speed Vr of the rocking edge at an instant when the metal elements leave the driven pulley. Therefore, the metal elements leaving the driven pulley have a kinetic energy larger than the metal elements lying in the chord portion, whereby the metal elements lying in the chord portion can forcibly be urged forwards and meshed with the drive pulley in a state placed in close contact with one another without being pitched. In addition, the speed Vg of the center of gravity of the metal elements is set smaller than the speed Vs of the radially outer end of the ring slot. Therefore, it can be avoided previously that the metal elements leaving the driven pulley are fallen down in a direction of movement with an excessive kinetic energy, whereby the metal elements lying in the chord portion can be smoothly brought into close contact with one another and meshed with the drive pulley without being pitched.

In addition to the above arrangement, there is provided a belt for a continuously variable transmission, wherein a relation, Vr<Vk<Vg<Vs is established when Vk represents the speed of a radially inner end of the ring slot of the metal element.

With the above arrangement, when an action for compacting a gap between the metal elements occurs at the chord portion extending from the driven pulley toward the drive pulley, a pitching moment acting on the metal elements can be reduced to enable the metal elements to be smoothly brought into close contact with one another.

BRIEF DESCRIPTION OF THE DRAWINGS

FIG. 1 is a skeleton illustration of a power transmitting system in a vehicle having a continuously variable transmission mounted thereon;

FIG. 2 is a perspective view of a metal belt section;

FIG. 3 is a view taken in the direction of an arrow 3 in FIG. 2;

FIG. 4 is a view of a metal belt wound around a drive pulley and a driven pulley;

FIG. 5 is a view for explaining a technique for regulating the center of gravity of a metal element;

FIG. 6 is a view for explaining a relation, Vr<Vk<Vg<Vs, corresponding to FIG. 3;

FIG. 7 is a view showing a dimension of each portion of the metal element;

FIG. 8 is a view showing each region of the metal belt;

FIG. 9 is a graph showing a variation of speeding each region of the metal belt.

BEST MODE FOR CARRYING OUT THE INVENTION

The mode for carrying out the present invention will now be described by way of an embodiment of the present invention shown in the accompanying drawings.

Figure 1:
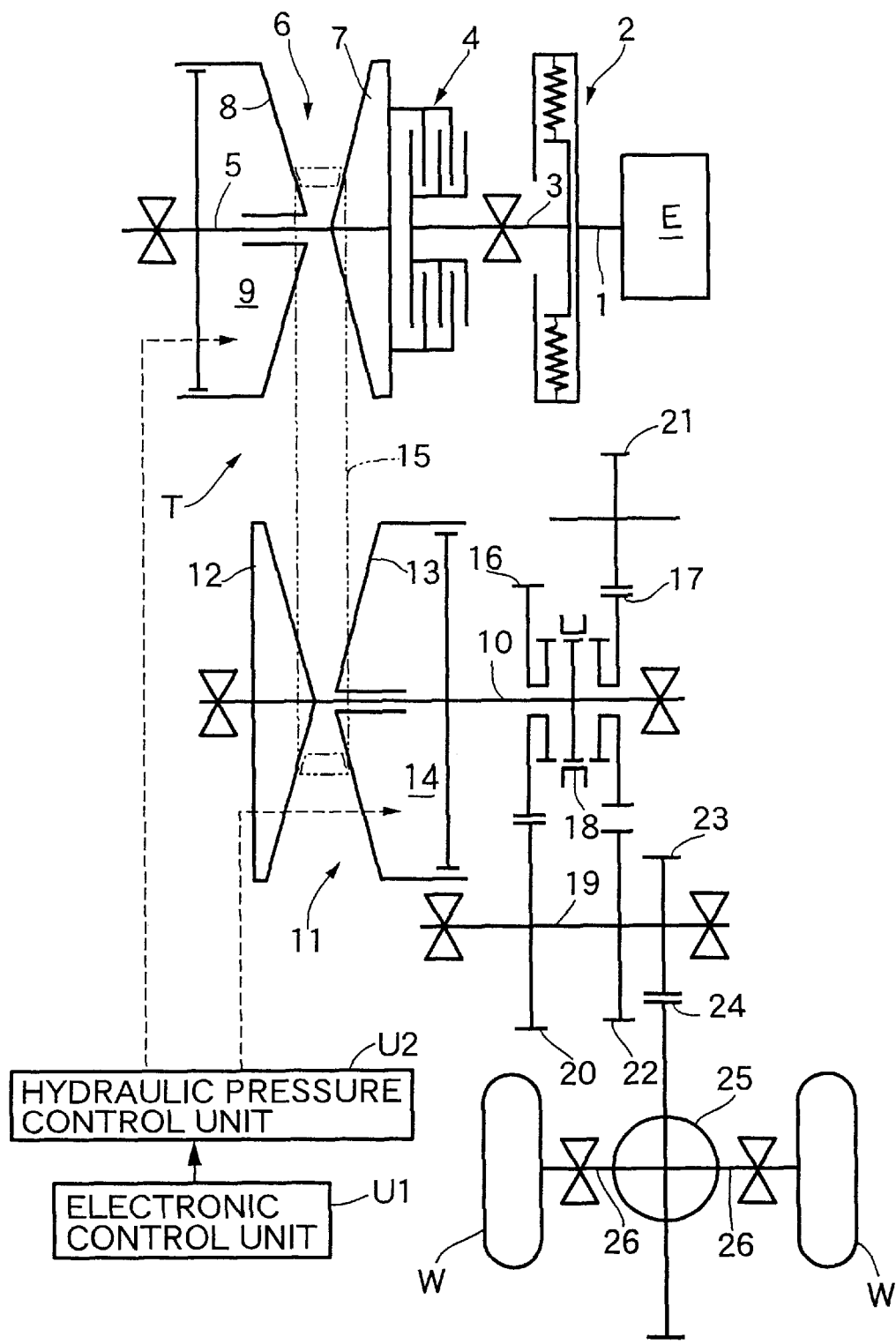
FIGS. 1 to 9 show an embodiment of the present invention.

FIG. 1 shows the skeleton structure of a metal belt-type continuously variable transmission T mounted on an automobile. An input shaft 3 is connected to a crankshaft 1 of an engine E through a damper 2 and also connected to a drive shaft 5 of the metal belt-type continuously variable transmission T through a starting clutch 4. A drive pulley 6 is mounted on the drive shaft 5 and includes a stationary pulley half 7 secured to the drive shaft 5, and a movable pulley half 8 which is movable toward and away from the stationary pulley half 7. The movable pulley half 8 is biased toward the stationary pulley half 7 by a hydraulic pressure applied to an oil chamber 9.

A driven pulley 11 is mounted on a driven shaft 10 disposed in parallel to the drive shaft 5, and includes a stationary pulley half 12 secured to the driven shaft 10, and a movable pulley half 13 which is movable toward and away from the stationary pulley half 12. The movable pulley half 13 is biased toward the stationary pulley half 12 by a hydraulic pressure applied to an oil chamber 14. A metal belt 15 comprising a large number of metal elements 32 supported on a pair of left and right metal ring assemblies 31, 31 is wound between the drive pulley 6 and the driven pulley 11 (see FIG. 2) . Each of the metal ring assemblies 31 comprises twelve metal rings 33 laminated one on another.

A forward drive gear 16 and a backward drive gear 17 are rotatably carried on the driven shaft 10 and are capable of being selectively coupled to the driven shaft 10 by a selector 18. Secured to an output shaft 19 disposed in parallel to the driven shaft 10 are a forward driven gear 20 meshed with the forward drive gear 16, and a backward driven gear 22 meshed with the backward drive gear 17 through a backward idle gear 21.

The rotation of the output shaft 19 is inputted to a differential 25 through a final drive gear 23 and a final driven gear 24 and then transmitted from the differential 25 through left and right axles 26, 26 to driven wheels W, W.

A driving force from the engine E is transmitted through the crankshaft 1, the damper 2, the input shaft 3, the starting clutch 4, the drive shaft 5, the drive pulley 6, the metal belt 15 and the driven pulley 11 to the driven shaft 10. When a forward travel range is selected, the driving force of the driven shaft 10 is transmitted through the forward drive gear 16 and the forward driven gear 20 to the output shaft 19 to move the vehicle forwards. When a backward travel range is selected, the driving force of the driven shaft 10 is transmitted through the backward drive gear 17, the backward idle gear 21 and the backward driven gear 22 to the output shaft 19 to move the vehicle backwards.

During this time, the shift ratio is continuously regulated by controlling the hydraulic pressures applied to the oil chamber 9 in the drive pulley 6 and the oil chamber 14 in the driven pulley 11 of the metal belt-type continuously variable transmission T by a hydraulic pressure control unit $U_2$ which is operated by a command from an electronic control unit $U_1$. More specifically, if the hydraulic pressure applied to the oil chamber 14 in the driven pulley 11 is increased relative to the hydraulic pressure applied to the oil chamber 9 in the drive pulley 6, a groove width of the driven pulley 11 is decreased, leading to an increased effective radius. Attendant on this, a groove width of the drive pulley 6 is increased, leading to a decreased effective radius. Therefore, the shift ratio of the metal belt-type continuously variable transmission T is varied continuously toward "LOW". Reversely, if the hydraulic pressure applied to the oil chamber 9 in the drive pulley 6 is increased relative to the hydraulic pressure applied to the oil chamber 14 in the driven pulley 11, the groove width of the drive pulley 6 is decreased, leading to an increased effective radius. Attendant on this, the groove width of the driven pulley 11 is increased, leading to a decreased effective radius. Therefore, the shift ratio of the metal belt-type continuously variable transmission T is varied continuously toward "OD".

Figure 2:
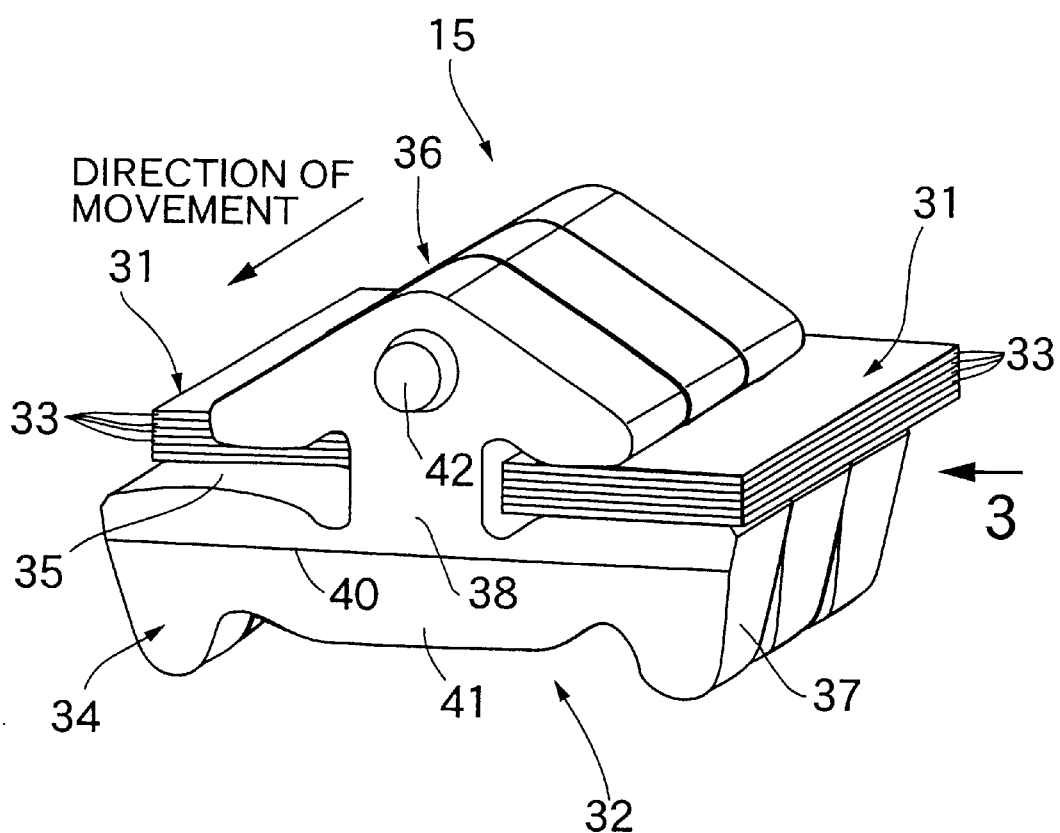
Figure 3:
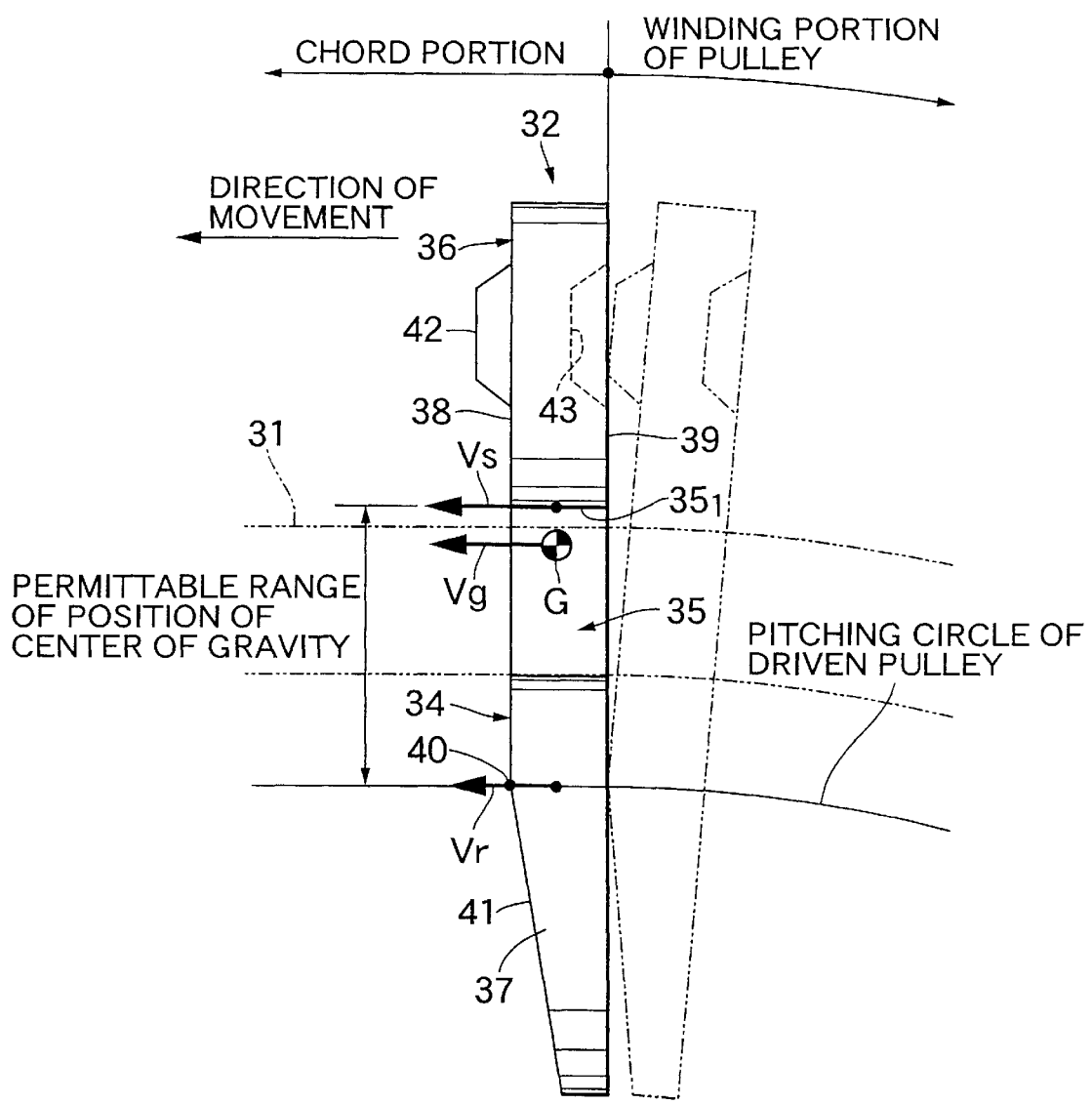

As shown in FIGS. 2 and 3, the metal element 32 formed from 10 a metal plate by punching includes a substantially trapezoidal element body 34, and a substantially triangular ear portion 36 connected to an upper portion of the element body 34 through a pair of left and right ring slots 35, 35 into which the metal ring assemblies 31, 31 are fitted. A pair of pulley abutment surfaces 37, 37 are formed on left and right opposite edges of the element body 34, and are capable of abutting against V-surfaces of the drive pulley 6 and the driven pulley 11. A pair of front and rear main surfaces 38 and 39 perpendicular to a direction of movement and parallel to each other are formed on front and rear sides of the metal element 32 in the direction of movement, and a slope 41 is formed below the main surface 38 on the front side in the direction of movement with a laterally extending rocking edge 40 interposed therebetween. Further, a projection 42 and a recess 43 are formed respectively on the main surface 38 on the front side in the direction of movement and the main surface 39 on the rear side in the direction of movement, which correspond to the ear portion 36.

As can be seen from FIG. 3, a center of gravity G of the metal element 32 is located radially outside the rocking edge 40 and radially inside the radially outer ends $35_1$, $35_1$ of the ring slots 35, 35. In other words, when the speed of the rocking edge 40 at an instant when the metal element 32 leaves the driven pulley 11 is represented by Vr; the speed of the center of gravity G of the metal element 32 is by Vg; and the speed of the radially outer ends $35_1$, $35_1$ of the ring slots 35, 35 is by Vs, a relation, Vr<Vg<Vs is established.

Figure 4:
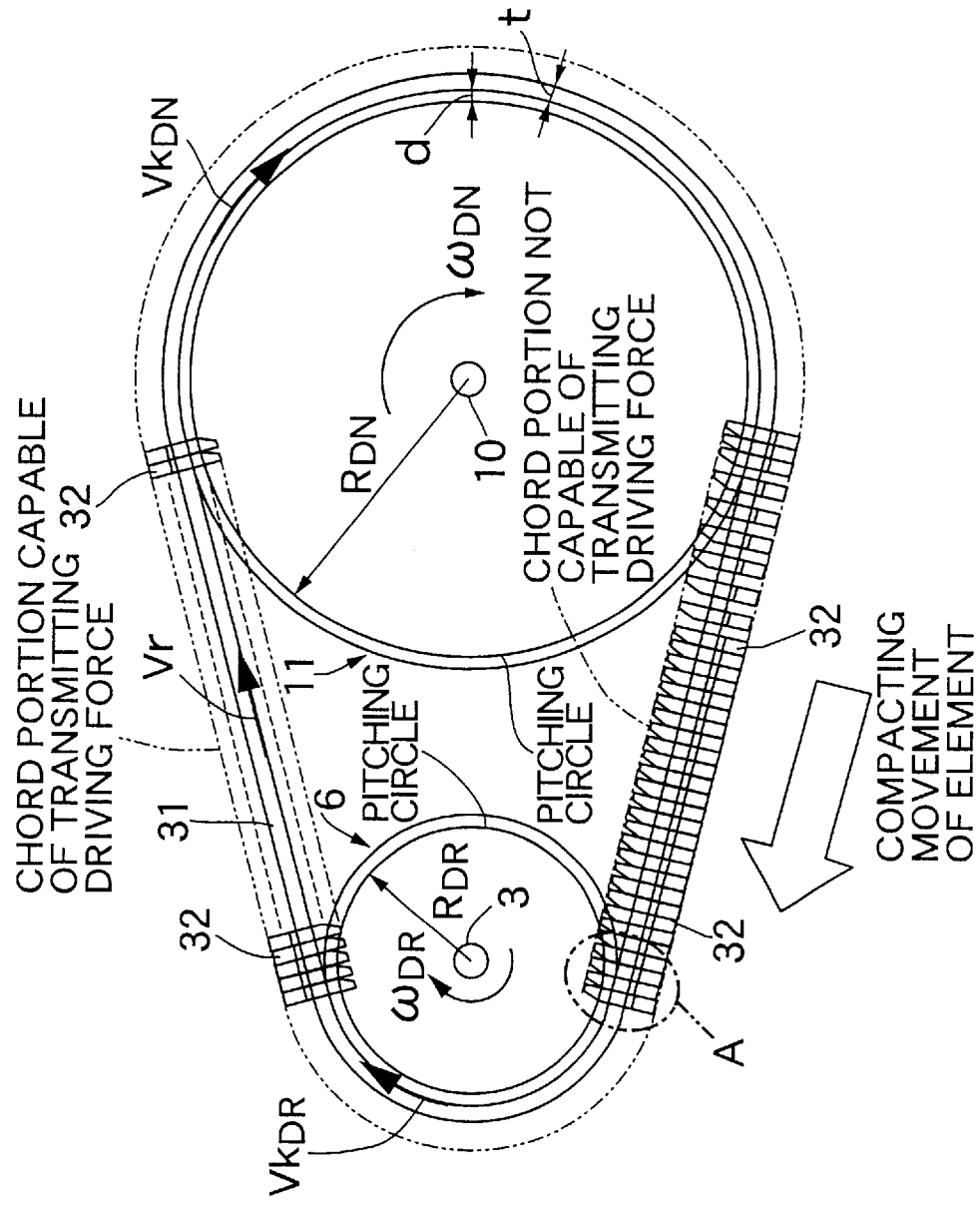

As shown in FIG. 4, the adjacent ones of the metal elements 32 lying in an advancing-side chord portion extending from the drive pulley 6 toward the driven pulley 11 (i.e., a chord portion capable of transmitting the driving force) transmit the driving force in a state in which the main surfaces 38 of the front side of the metal element 32 and the main surface 39 of the rear side of the metal element 32 are in abutment against each other, and the projection 42 of the front side of the metal element 32 has been fitted in the recess 43 of the rear side of the metal element 32. The metal elements 32 wound around the drive pulley 6 and the driven pulley 11 are swung around the rocking edge 40 by releasing of the contact of the main surfaces 38 and 39 with each other, and are arranged radiately in a radial direction of the pulleys 6 and 11.

On the other hand, a small gap is produced at an outlet side of the driven pulley 11 between the metal elements 32 lying in a returning-side chord portion extending from the driven pulley 11 toward the drive pulley 6 (i.e., a chord portion incapable of transmitting the driving force). For this reason, the metal elements 32, which cannot maintain the attitude with the main surfaces 38 and 39 put into abutment against each other, are liable to be inclined. In this embodiment, however, since the speed Vg of the center of gravity G of the metal element 32 is set larger than the speed Vr of the rocking edge 40 at an instant when the metal element 32 is moved away from the driven pulley 11, the metal element 32 leaving the driven pulley 11 is released to the returning-side chord portion with a kinetic energy larger than that of the metal element 32 lying in the returning-side chord portion. Therefore, the element 32 on the chord portion can be forcibly urged toward the drive pulley 6 with such vigor. As a result, the gap produced at the outlet side of the driven pulley 11 between the metal elements 32 on the returning-side chord portion is gradually decreased as approaching the drive pulley 6 and moreover, the inclined metal elements 32 are gradually risen and arranged in close contact with one another at the inlet side of the drive pulley 6, whereby they are meshed with the drive pulley 6 in an attitude free of pitching. Thus, it is possible to eliminate a problem that the wearing of the metal elements 32 and the drive pulley 6 is increased, and a problem that the power transmitting efficiency is reduced.

Moreover, since the speed Vg of the center of gravity G of the metal element 32 is set smaller than the speed Vs of the radially outer ends $35_1$, $35_1$ of the ring slots 35, 35, it can be prevented that the metal element 32 leaving the driven pulley 11 has an excessive kinetic energy to generate a large moment around the metal ring assemblies 31, 31, and the falling of the metal element 32 in the pitching direction can be previously avoided, whereby the metal elements 32 can be brought into close contact with one another and smoothly meshed with the drive pulley 6.

Figure 5:
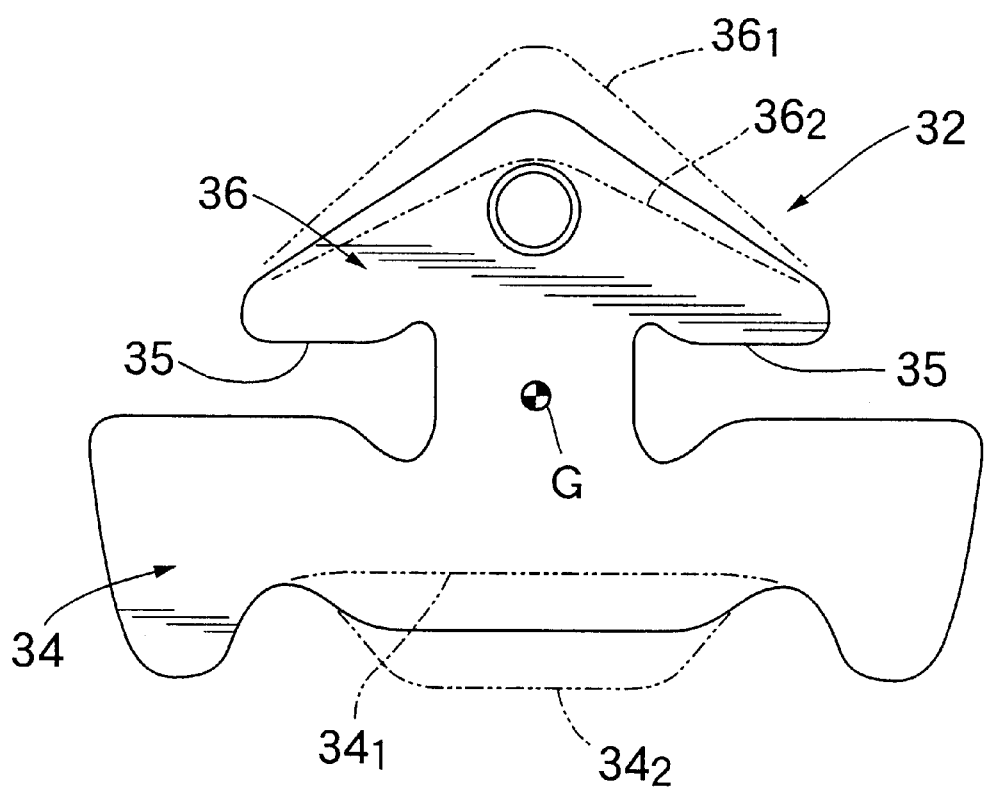

FIG. 5 shows a technique for regulating the position of the center of gravity G of the metal element 32. To move the center of gravity G of the metal element 32 radially outwards (upwards in FIG. 5), the lower edge of the element body 34 may be changed to a position $34_1$, and/or the upper edge of the ear portion 36 may be changed to a position $36_1$. To move the center of gravity G of the metal element 32 radially inwards (downwards in FIG. 5), the lower edge of the element body 34 may be changed to a position $34_2$, and/or the upper edge of the ear portion 36 may be changed to a position $36_2$.

It should be noted here that in addition to the above-described relation, Vr<Vg<Vs, when the speed of radially inner ends $35_2$, $35_2$ of the ring slots 35, 35 (a saddle surface speed) is represented by Vk, if the relation Vr<Vk<Vg<Vs is established, further effects can be obtained, which will be described with reference to FIGS. 4 and 6 to 9.

Figure 6:
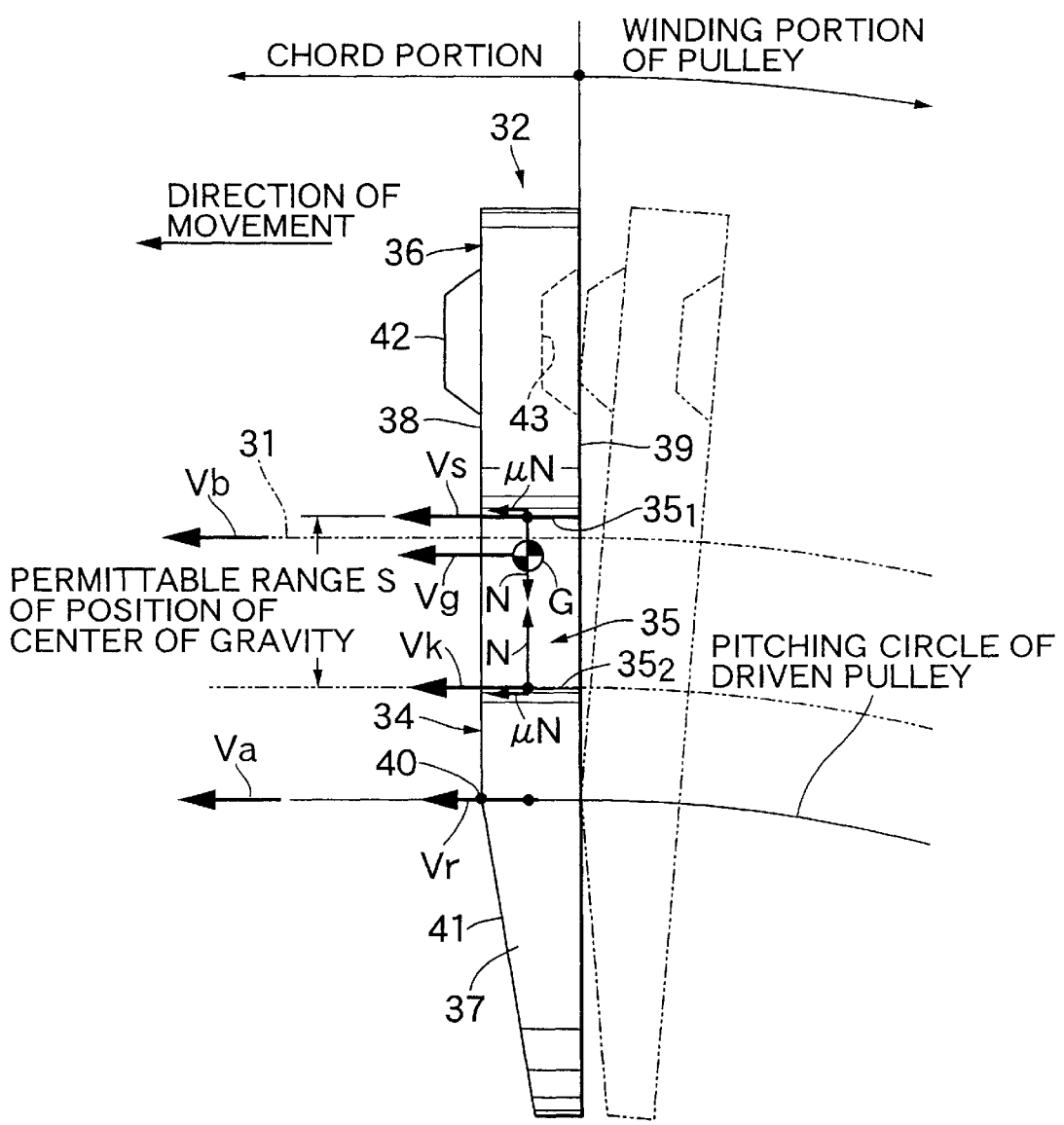

As shown in FIG. 6, small vertical drags N, N act between the radially outer ends $35_1$, $35_1$ and the radially inner ends $35_2$, $35_2$ of the ring slots 35, 35 and the metal ring assemblies 31, 31 even in the chord portion on which the urging force acting between the elements does not act. An inner peripheral speed Va and an outer peripheral speed Vb of the metal ring assemblies 31, 31 in the chord portion are not the same as the speed Vr of the rocking edge 40 in the metal element 32, and the relation is Va>Vr and Vb>Vr as will be described below.

In the chord portion with which the metal elements 32 move in parallel, the speed Vr of the rocking edge 40 of the metal element 32 accords with the speed Vk of the radially inner ends $35_2$, $35_2$ and the speed Vs of the radially outer ends $35_1$, $35_1$ of the ring slots 35, 35. Therefore, if the inner peripheral surfaces of the metal ring assemblies 31, 31 interfere with the radially inner ends $35_2$, $35_2$ of the ring slots 35, 35, the metal element 32 having a low speed is driven forwards by the metal ring assemblies 31, 31 having a high speed due to the friction force. Furthermore, if the outer peripheral surfaces of the metal ring assemblies 31, 31 interfere with the radially outer ends $35_1$, $35_1$ of the ring slots 35, 35, the metal element 32 having a low speed is driven forwards by the metal ring assemblies 31, 31 having a high speed due to a friction force. As a result, an action for compacting the gap between the metal elements 32 occurs in the chord portion.

Here, the reason why the relations, Va>Vr and Vb>Vr are established will be described below.

In FIG. 4, when the speed of the rocking edge 40 of the metal element 32 in the chord portion between the drive pulley 6 and the driven pulley 11 (the speed of a pitch line) is represented by Vr, an angular speed of the drive pulley 6 is by $\omega_{DR}$, an angular speed of the driven pulley 11 by $\omega_{DN}$, a pitch radius of the drive pulley 6 by $R_{DR}$, and a pitch radius of the driven pulley 11 by $R_{DN}$, the following equations are established:

$$\omega_{Dr} = Vr/R_{DR}$$

$$\omega_{DN} = Vr/R_{DN}$$

Here, when d represents the difference between the radius of radially inner ends $35_2$, $35_2$ of the ring slots 35, 35 (a radius of the saddle surface) and the pitch radii $R_{DR}$, $R_{DN}$, the speeds $Vk_{DR}$ and $Vk_{DN}$ of the radially inner ends $35_2$, $35_2$ of the ring slots 35, 35 in the drive pulley 6 and the driven pulley 11 (a saddle surface speed) are given by the following equations, respectively:

$$VK_{DR} = (R_{DR} + d) * \omega_{DR} = (R_{DR} + d) * (Vr/R_{DR})$$

$$Vk_{DN} = (R_{DN} + d) * \omega_{DN} = (R_{DN} + d) * (Vr/R_{DN})$$

When the shift ratio is in the "LOW" side from 1.0, at the side of the driven pulley 11, the radially inner ends $35_2$, $35_2$ of the ring slots 35, 35 and each layer of the metal ring 33 rotate substantially without relative slipping. Therefore, the inner peripheral speed Va of the metal ring assemblies 31, 31 is substantially the same as the speed $Vk_{DN}$ of the radially inner ends $35_2$, $35_2$ of the ring slots 35, 35 in the driven pulley 11.

Therefore, if the difference between the inner peripheral speed Va of the metal ring assemblies 31, 31 in the chord portion and the speed Vr of the rocking edge 40 is calculated, the following equation can be obtained:

$$Va - Vr = Vk_{DN} - Vr$$
$$= (R_{DN} + d) * (Vr/R_{DN}) - Vr$$
$$= (d/R_{DN}) * Vr > 0$$

and the inner peripheral speed Va of the metal ring assemblies 31, 31 is larger than the speed Vr of the rocking edge 40.

Further, when the shift ratio is in the "OD" side from 1.0, at the side of the drive pulley 6, the radially inner ends $35_2$, $35_2$ of the ring slots 35, 35 and each layer of the metal ring 33 rotate substantially without relative slipping. Therefore, the inner peripheral speed Va of the metal ring assemblies 31, 31 is substantially the same as the speed $Vk_{DR}$ of the radially inner ends $35_2$, $35_2$ of the ring slots 35, 35 in the drive pulley 6.

Therefore, if the difference between the inner peripheral speed Va of the metal ring assemblies 31, 31 in the chord portion and the speed Vr of the rocking edge 40 is calculated, the following equation can be obtained:

$$Va - Vr = Vk_{DR} - Vr$$
$$= (R_{DR} + d) * (Vr/R_{DR}) - Vr$$
$$= (d/R_{DR}) * Vr > 0$$

and the inner peripheral speed Va of the metal ring assemblies 31, 31 is larger than the speed Vr of the rocking edge 40.

From the foregoing, the relation, Va>Vr is established in all the shift ratios.

On the other hand, the difference Vb−Vr between the outer peripheral speed Vb of the metal ring assemblies 31, 31 and the speed Vr of the rocking edge 40 can be obtained by defining the thickness of the metal ring assemblies 31, 31 as t and replacing d of the above theory with d+t. More specifically, when the shift ratio is in the "LOW" side from 1.0, at the side of the driven pulley 11, the outer peripheral speed Vb of the metal ring assemblies 31, 31 is substantially the same as the speed $Vs_{DN}$ of the radially outer ends $35_1$, $35_1$ of the ring slots 35, 35 and hence, the following equation can be obtained:

$$Vb - Vr = Vs_{DN} - Vr$$
$$= (R_{DN} + d + t) * (Vr/R_{DN}) - Vr$$
$$= \{(d + t)/R_{DN}\} * Vr > 0$$

and the outer peripheral speed Vb of the metal ring assemblies 31, 31 is larger than the speed Vr of the rocking edge 40.

When the shift ratio is in the "OD" side from 1.0, at the side of the drive pulley 6, the outer peripheral speed Vb of the metal ring assemblies 31, 31 is substantially the same as the speed $Vs_{DR}$ of the radially outer ends $35_1$, $35_1$ of the ring slots 35, 35 and hence, the following equation can be obtained:

$$Vb - Vr = Vs_{DR} - Vr$$
$$= (R_{DR} + d + t) * (Vr/R_{DR}) - Vr$$
$$= \{(d + t)/R_{DR}\} * Vr > 0$$

and the outer peripheral speed Vb of the metal ring assemblies 31, 31 is larger than the speed Vr of the rocking edge 40.

From the foregoing, the relation, Vb>Vr is established in all the shift ratios.

TABLE 1

Speed of each portion in the advancing direction of the belt (m/sec)

| Name of portion | | Wound portion D of DR pulley | Chord portions A, C | Wound portion B of DN pulley |
|---|---|---|---|---|
| Vs | Outer end of slot | 43.79 | 41.66 | 45.16 |
| Vb | Outer periphery of ring | 43.67 | 43.67 | 43.67 |
| Va | Inner periphery of ring | 42.30 | 42.30 | 42.30 |
| Vk | Inner end of slot | 42.30 | 41.66 | 42.69 |
| Vr | Rocking edge | 41.66 | 41.66 | 41.66 |
| Vg | Center of gravity | 42.60 | 41.66 | 43.20 |

Figure 7:
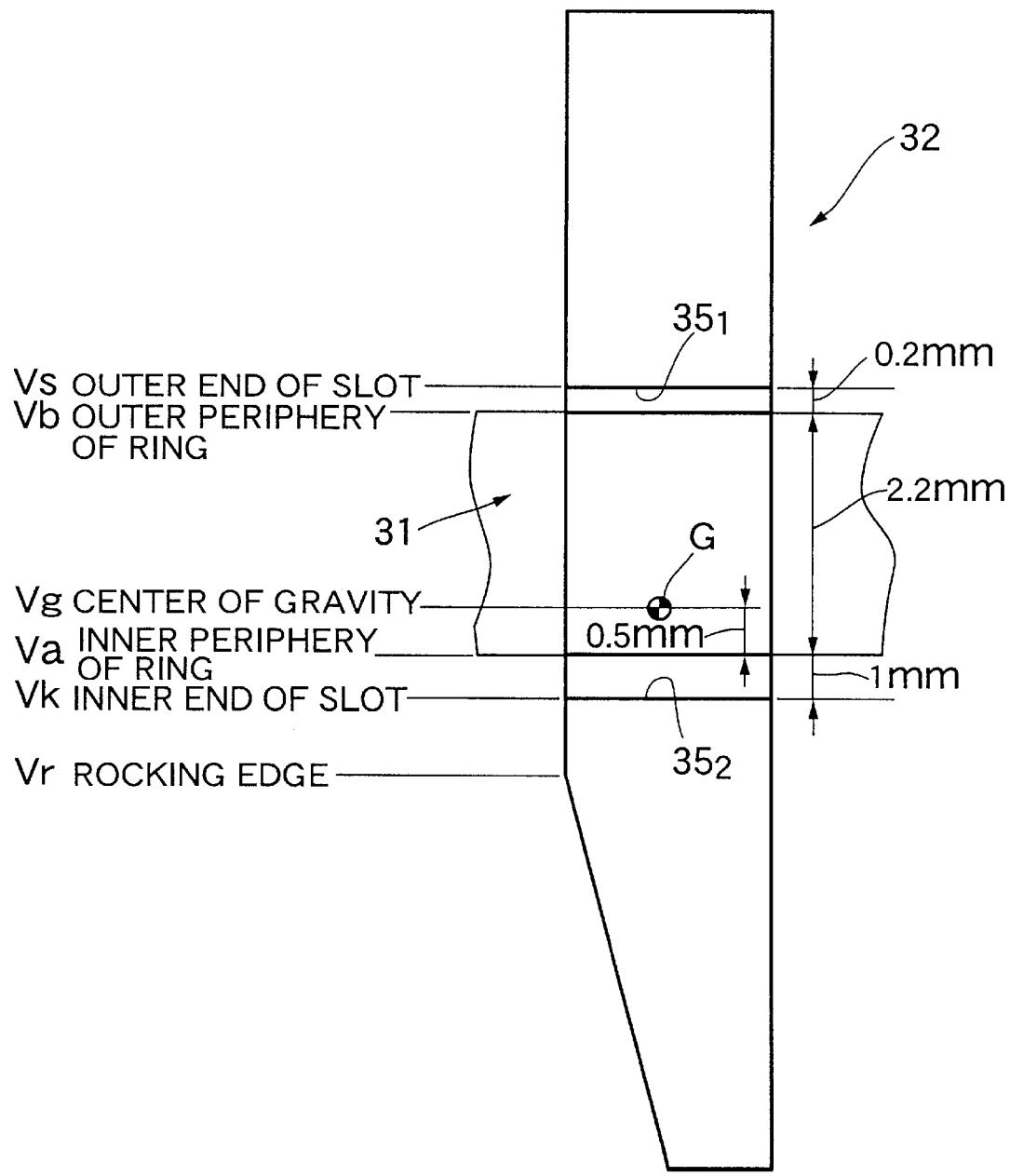
Figure 8:
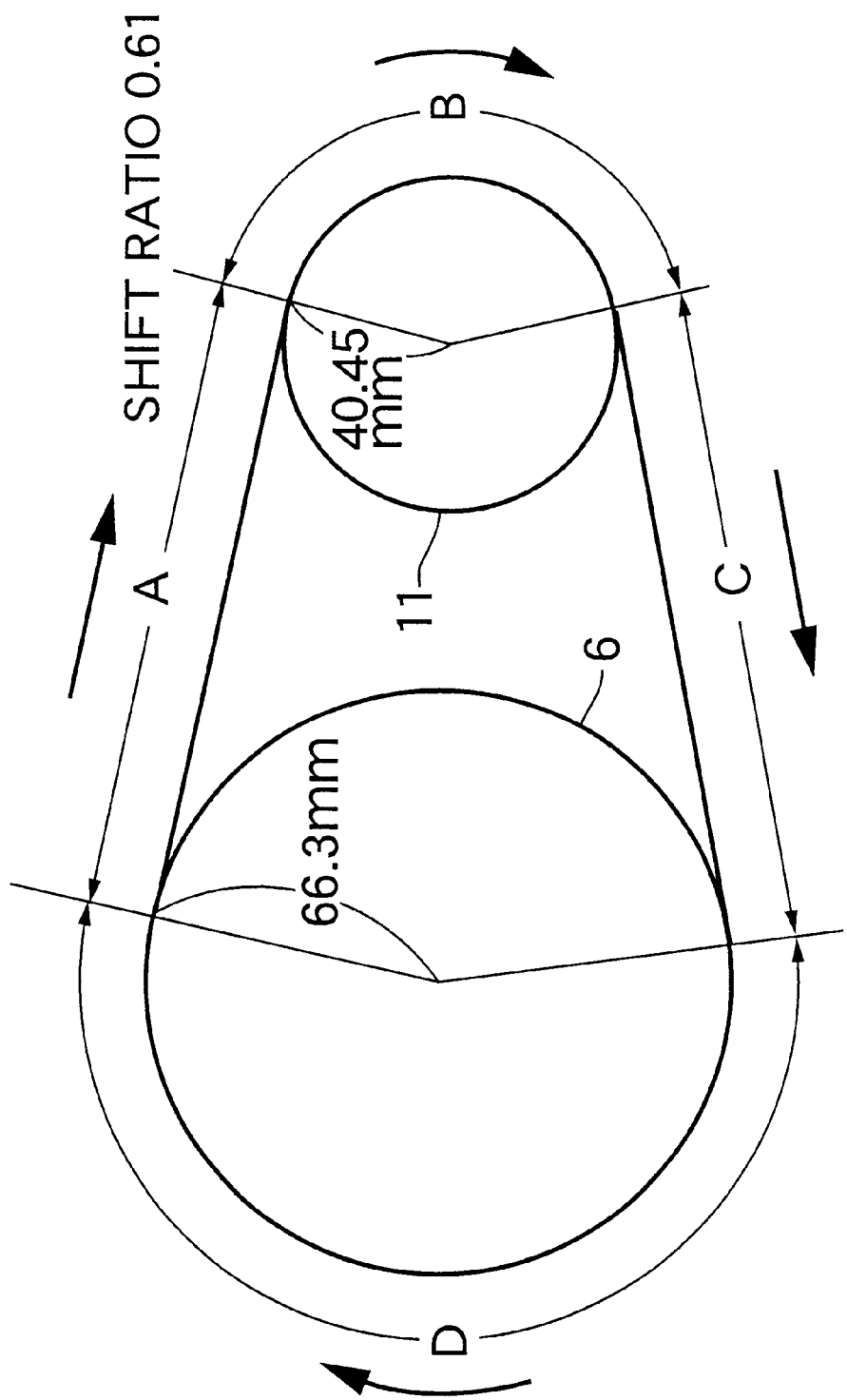
Figure 9:
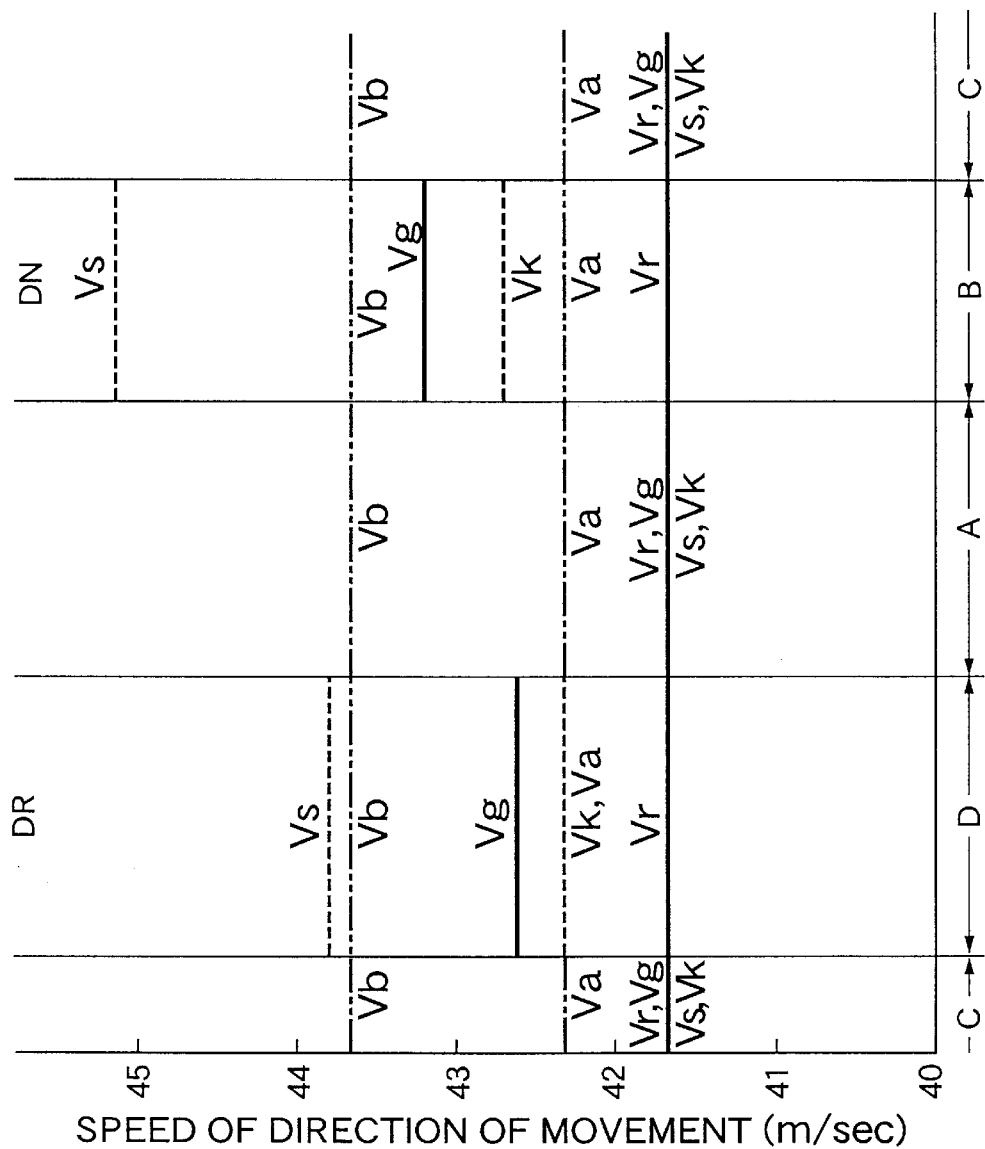
Figure 10:
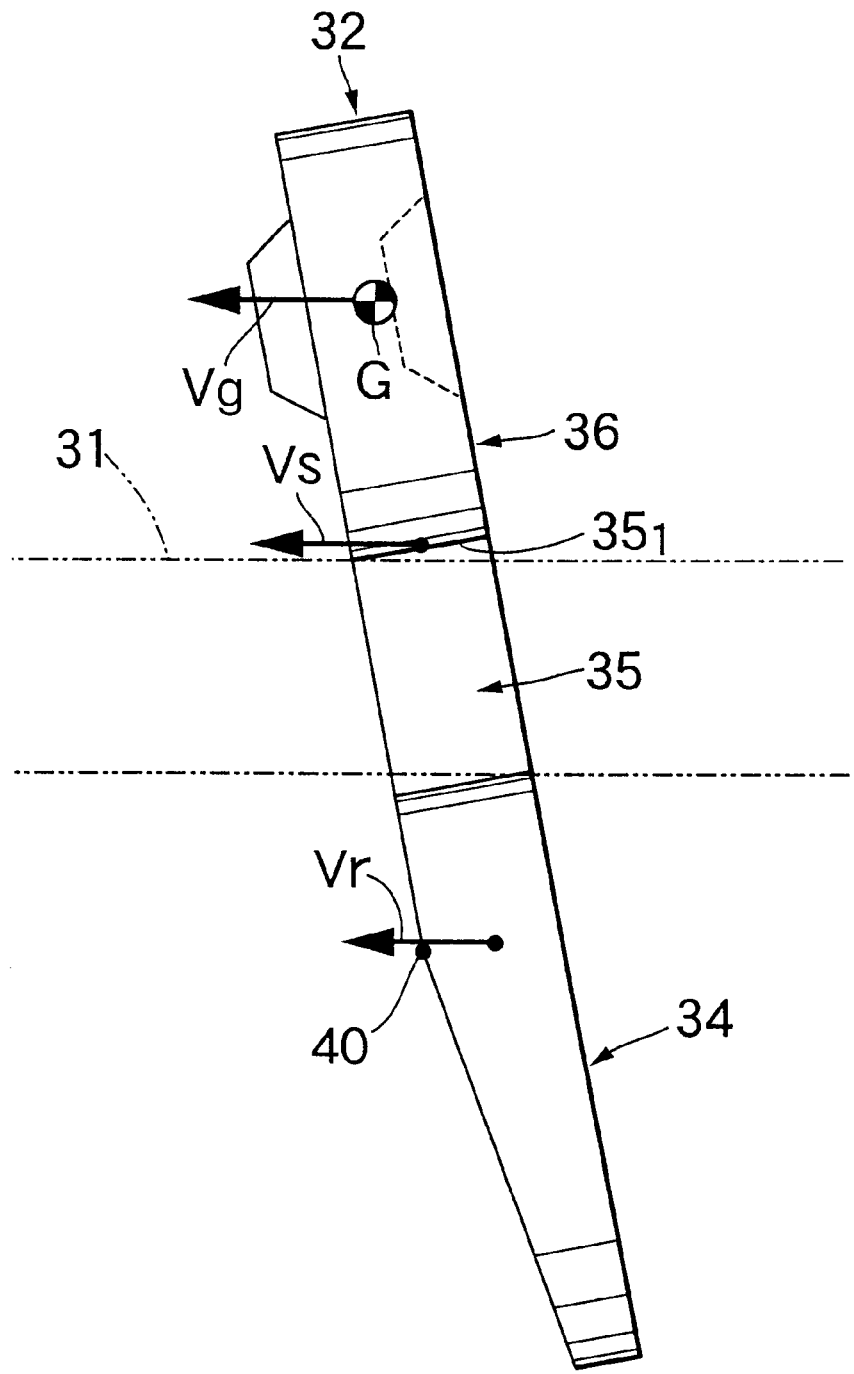
FIG. 10 is a view for explaining the problems of the prior art.

Table 1 and FIG. 9 show variations in the speeds Vs, Vb, Va, Vk, Vr and Vg of respective portions of the metal ring 15 at each of regions A, B, C and D when the transmission is operated 10 at the maximum output with an input torque of 14.4 kgf-m, an input rotational speed of 6000 rpm and a shift ratio of 0.61 using the metal belt 15 having the metal elements 32 of the dimension shown in FIG. 7. The definition of each of the regions A, B, C and D of the metal ring 15 is shown in FIG. 8.

As is apparent from Table 1 and FIG. 9, it can be seen that in the chord portions A and C at which the metal elements 32 move in parallel, the speed Vs of the radially outer ends $35_1$, $35_1$ of the ring slots 35, 35, the speed Vk of the radially inner ends $35_2$, $35_2$ of the ring slots 35, 35, the speed Vr of the rocking edge 40 and the speed Vg of the center of gravity G are the same, and that the outer and inner peripheral speeds Vb and Va of the metal ring assemblies 31, 31 exceed the speeds Vs, Vk, Vr and Vg of each of the portions of the metal element 32. Additionally, it can be seen that the speed Vg of the center of gravity G in the regions B and D where the metal elements 32 are wound around the driven pulley 11 and the drive pulley 6 exceeds the speed Vg of the center of gravity G in the chord portions A and C.

Now, returning to the explanation of FIG. 6, in the chord portion on which the urging force acting between the elements does not act, the frictional forces $\mu N$, $\mu N$ ($\mu$ is a coefficient of friction) acting from the metal ring assemblies 31, 31 to the metal element 32 by the vertical drags N, N act on the radially outer ends $35_1$, $35_1$ or radially inner ends $35_2$, $35_2$ of the ring slots 35, 35. Even when points of action of the frictional forces $\mu N$, $\mu N$ are in either of the radially outer ends $35_1$, $35_1$ or the radially inner ends $35_2$, $35_2$ of the ring slots 35, 35, if the center of gravity G of the metal element 32 is positioned between the radially outer ends $35_1$, $35_1$ and the radially inner ends $35_2$, $35_2$ of the ring slots 35, 35, a moment, which is generated around the center of gravity G by the frictional force $\mu N$ acting on the radially outer ends $35_1$, $35_1$ of the ring slots 35, 35 or the frictional force $\mu N$ acting on the radially inner ends $35_2$, $35_2$ can be maintained to $S \times \mu N$ or less where S represents the width of the ring slots 35, 35.

If the center of gravity G deviates from the range between the radially outer ends $35_1$, $35_1$ and the radially inner ends $35_2$, $35_2$ of the ring slots 35, 35, a relatively large moment exceeding $S \times \mu N$ acts around the center of gravity G, whereby a possibility arises that the behavior of the metal element 32 might be unstable in the chord portion on which the urging force acting between the elements does not act. Therefore, in order to stabilize the behavior of the metal element 32 in the chord portion, it is required that the relation, Vk<Vg<Vs should be established at least at an instant when the metal element 32 leaves the driven pulley 11, by positioning the center of gravity G of the metal element 32 between the radially outer ends $35_1$, $35_1$ and the radially inner ends $35_2$, $35_2$ of the ring slots 35, 35.

Further, as is described in, it is required that the relation, Vr<Vg should be established between the speed Vr of the rocking edge 40 and the speed Vg of the center of gravity G at an instant when the metal element 32 leaves the driven pulley 11, and that the relation Vr<Vk should be established between the speed Vr of the rocking edge 40 and the speed Vk of the radially inner ends $35_2$, $35_2$ of the ring slots 35, 35 in a general design of the metal belt 15. Considering them, it is required that the relation, Vr<Vk<Vg<Vs should finally be established. If the relation, Vr<Vk<Vg<Vs is established, even when the action for compacting the gap between the metal elements 32 occurs in the chord portion extending from the driven pulley 11 toward the drive pulley 6, it is possible to maintain the pitching moment for falling the metal element 32 to the minimum and to smoothly bring the metal elements 32 in close contact with each other.

Although the embodiment of the present invention has been described in detail, it will be understood that the present invention is not limited to the above-described embodiment, and various modifications in design may be made without departing from the subject matter of the invention.

What is claimed is:

1. A belt for a continuously variable transmission, comprising a large number of metal elements (32) supported on metal ring assemblies (31) each of which is comprised of a plurality of endless metal rings (33) laminated one on another, said belt being wound around a drive pulley (6) and a driven pulley (11) to transmit a driving force between both of said pulleys (6 and 11), characterized in that said metal elements (32) include ring slots (35) for supporting said metal ring assemblies (31), and are pitchably in abutment against one another with a rocking edge (40) interposed therebetween, and the following relation is established:

$Vr<Vg<Vs$ wherein, at an instant when said metal element (32) leaves said driven pulley (11), Vr represents a speed of the said rocking edge (40); Vg represents a speed of the center of gravity (G) of said metal element (32); and Vs represents a speed of a radially outer end ($35_1$) of said ring slot (35).

2. A belt for a continuously variable transmission according to claim 1, wherein the following relation is established:

$Vr<Vk<Vg<Vs$ when Vk represents the speed of a radially inner end ($35_2$) of said ring slot (35) of said metal element (32).

* * * * *